US011428519B2

(12) United States Patent
Banowetz (10) Patent No.: US 11,428,519 B2
(45) Date of Patent: Aug. 30, 2022

(54) SYSTEMS AND METHODS FOR MEASURING AND ADJUSTING GATE OPENINGS OF SLICING MACHINES (71) Applicant: URSCHEL LABORATORIES, INC., Chesterton, IN (US)

(72) Inventor: Daniel Lawrence Banowetz, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 716 days.

(21) Appl. No.: 16/394,203

(22) Filed: Apr. 25, 2019

(65) Prior Publication Data
US 2019/0331472 A1    Oct. 31, 2019

Related U.S. Application Data (60) Provisional application No. 62/662,289, filed on Apr. 25, 2018.

(51) Int. Cl.
*G01B 5/14* (2006.01)
*B26D 7/06* (2006.01)
*B26D 7/26* (2006.01)
*B26D 1/03* (2006.01)

(52) U.S. Cl.
CPC ............ *G01B 5/14* (2013.01); *B26D 7/0691* (2013.01); *B26D 7/2628* (2013.01); *B26D 1/03* (2013.01); *B26D 2210/02* (2013.01)

(58) Field of Classification Search
CPC .. G01B 5/14; B23Q 17/0919; B23Q 17/2216; B23Q 17/2225
See application file for complete search history.

(56) References Cited

U.S. PATENT DOCUMENTS 3,479,743 A * 11/1969 Zemberry ................ G01B 5/18
409/218
3,583,403 A * 6/1971 Pohl ..................... A61B 17/322
606/132
4,662,075 A * 5/1987 Mastel .................. A61F 9/0133
33/201
(Continued)

OTHER PUBLICATIONS

International Search Report for International Application No. PCT/US2019/029122, filed Apr. 25, 2019, (3 pages).

*Primary Examiner* — Sean M Michalski
(74) *Attorney, Agent, or Firm* — Hartman Global IP Law; Gary M. Hartman; Domenica N. S. Hartman (57) ABSTRACT

Instruments and methods for measuring and adjusting gate openings of a slicing machine utilizing a gauge system that includes a frame, a device for securing the frame to the interior surface of a cutting head, a device for locating the frame relative to a knife and/or a gate of the cutting head that define the gate opening therebetween, and a device mounted to the frame for measuring the gate opening. The measuring device includes an anvil biased in an outward direction relative to the frame, an indicator mounted to the anvil and biased therewith in the outward direction relative to the frame, and a probe of the indicator biased in the outward direction relative to the indicator. The probe and anvil provide a outward measurement of the gate opening based on a differential measurement of surfaces of the knife and gate.

9 Claims, 8 Drawing Sheets (56) References Cited

U.S. PATENT DOCUMENTS

| | | | | |
|---|---|---|---|---|
| 5,492,003 | A | * | 2/1996 | D'Anna .................. G01B 3/24 33/784 |
| 5,555,787 | A | | 9/1996 | Barber et al. |
| 5,657,550 | A | * | 8/1997 | Struble .................. G01B 5/14 33/544.4 |
| 6,575,069 | B1 | | 6/2003 | Harwarth et al. |
| 8,296,963 | B1 | * | 10/2012 | Omelaz ............. B23Q 17/2216 33/641 |
| 8,336,225 | B1 | | 12/2012 | Zhang |
| 2004/0231476 | A1 | * | 11/2004 | Weber ................. B26D 7/2635 83/13 |
| 2007/0028742 | A1 | | 2/2007 | Mueller et al. |
| 2012/0272539 | A1 | * | 11/2012 | Khan .................. B26D 7/2628 73/1.79 |
| 2012/0272540 | A1 | * | 11/2012 | Omelaz, Jr. ........ B23Q 17/0919 73/1.79 |
| 2013/0068076 | A1 | | 3/2013 | Schmeiser et al. |
| 2016/0245637 | A1 | * | 8/2016 | Hyslop .................... G01B 5/14 |
| 2016/0297090 | A1 | * | 10/2016 | Nazar .................. B26D 1/225 |
| 2018/0023945 | A1 | * | 1/2018 | Mariller .................. G01B 5/12 33/832 |
| 2018/0126581 | A1 | * | 5/2018 | Jacko .................. B26D 7/0691 |
| 2018/0364020 | A1 | * | 12/2018 | Schultz .................... G01B 5/14 |
| 2019/0331472 | A1 | * | 10/2019 | Banowetz .......... B23Q 17/0919 |

* cited by examiner

SYSTEMS AND METHODS FOR MEASURING AND ADJUSTING GATE OPENINGS OF SLICING MACHINES

CROSS-REFERENCE TO RELATED APPLICATIONS

This application claims the benefit of U.S. Provisional Application No. 62/662,289, filed Apr. 25, 2018, the contents of which are incorporated herein by reference.

BACKGROUND OF THE INVENTION

The present invention generally relates to machines for cutting products, including but not limited to slicing machines adapted for slicing food products. The invention particularly relates to instruments, tools, and methods for measuring, configuring, and adjusting gate openings to control slice thicknesses produced by slicing machines.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the names Model CC® and Model CCL. The Model CC and CCL machines are centrifugal-type slicers capable of slicing a wide variety of products at high production capacities. The Model CC® line of machines is particularly adapted to produce uniform slices, strip cuts, shreds and granulations.

Figure 1:
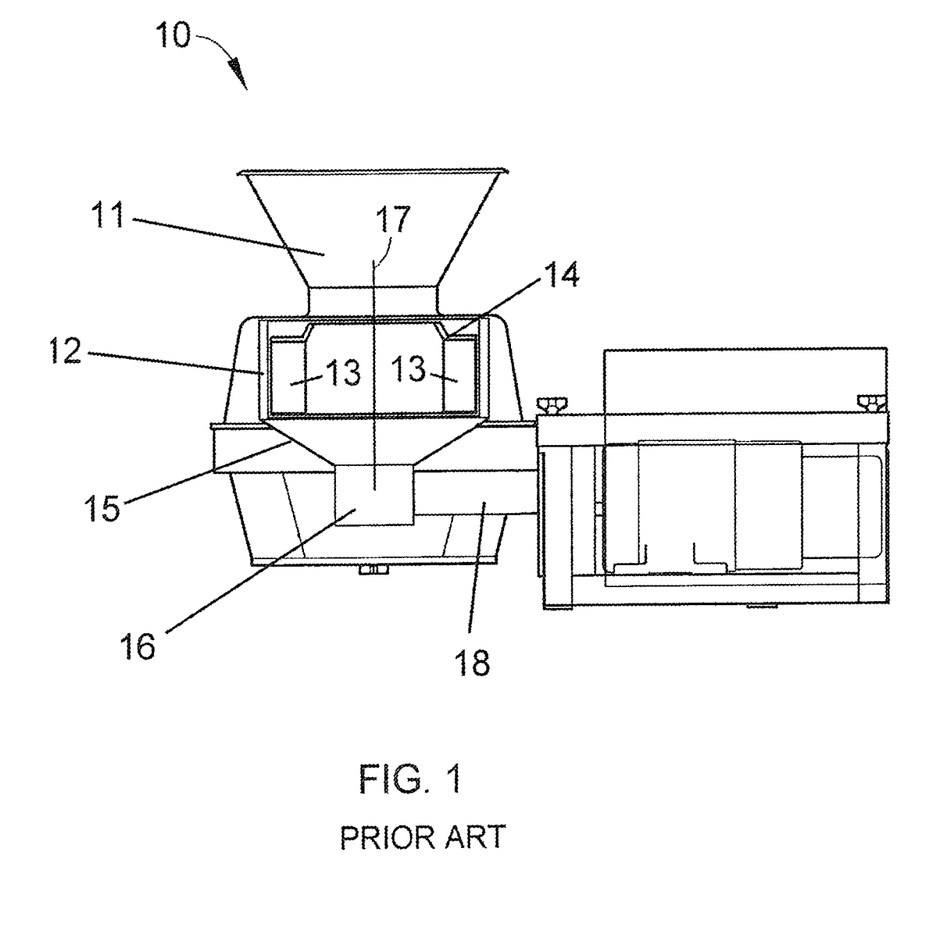
FIG. 1 schematically represents a side view in partial cross-section of a slicing machine known in the art.

FIG. 1 schematically depicts a machine 10 representative of a Model CC® machine. The machine 10 includes a generally annular-shaped cutting head 12 equipped with cutting knives (not shown) mounted at its inner circumference. An impeller 14 is coaxially mounted within the cutting head 12 and has an axis 17 of rotation that coincides with an axis of the cutting head 12. The impeller 14 is rotationally driven about its axis 17 through a shaft that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with the knives of the cutting head 12. The impeller 14 comprises generally radially-oriented paddles 13, each having a face that engages and directs the products radially outward toward and against the knives of the cutting head 12 as the impeller 14 rotates. Other aspects pertaining to the construction and operation of Model CC® machines, including improved embodiments thereof, can be appreciated from U.S. Pat. Nos. 3,139,128, 3,139,129, 5,694,824, 6,968,765, 7,658,133, 8,161,856, 9,193,086, 9,469,041, and 9,517,572 and U.S. Patent Application Publication Nos. 2016/0158953 and 2016/0361831, the entire contents of which are incorporated herein by reference.

Figure 2:
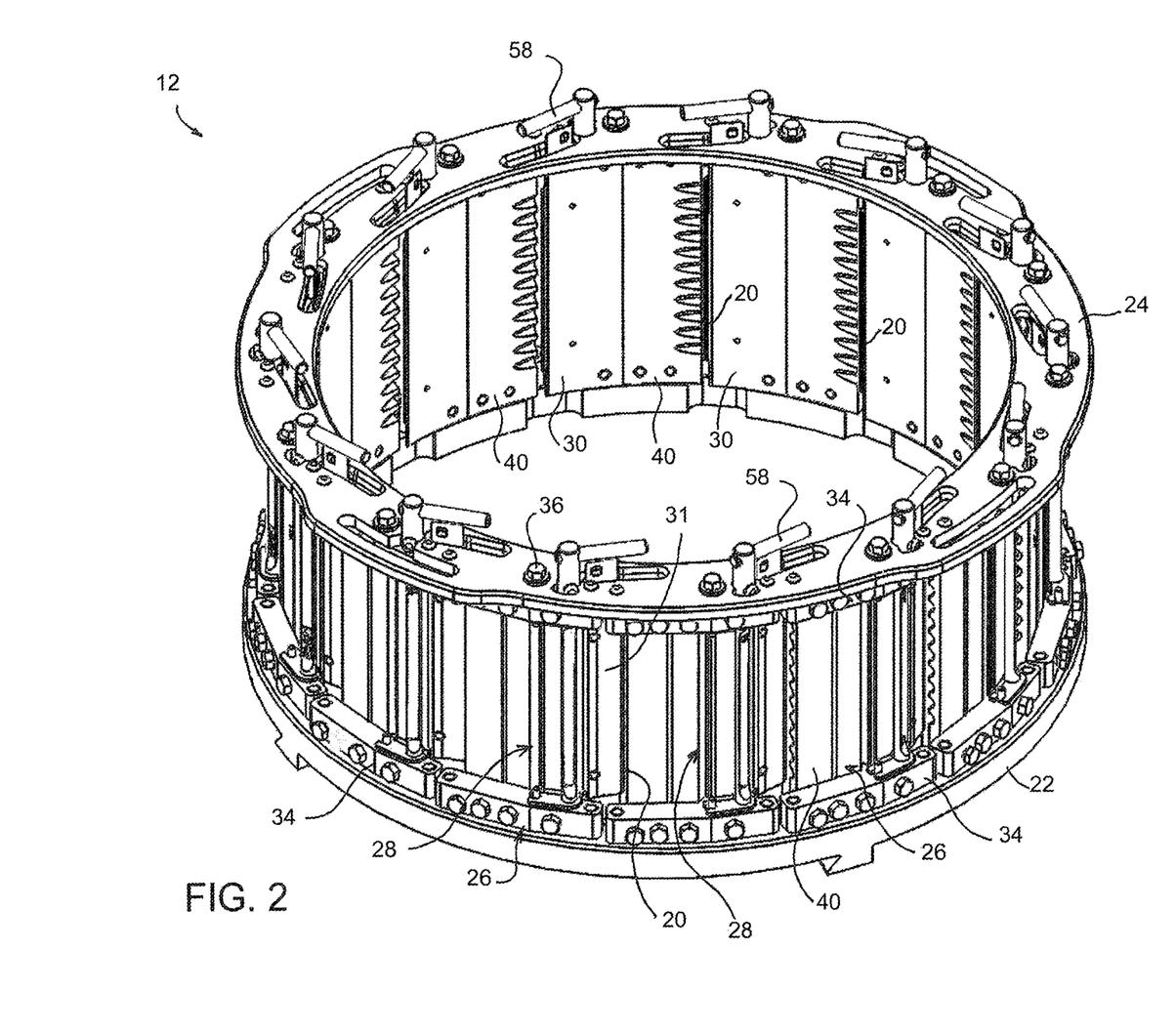
FIG. 2 is a perspective view representing a cutting head of a type suitable for use with the slicing machine of FIG. 1.
Figure 3:
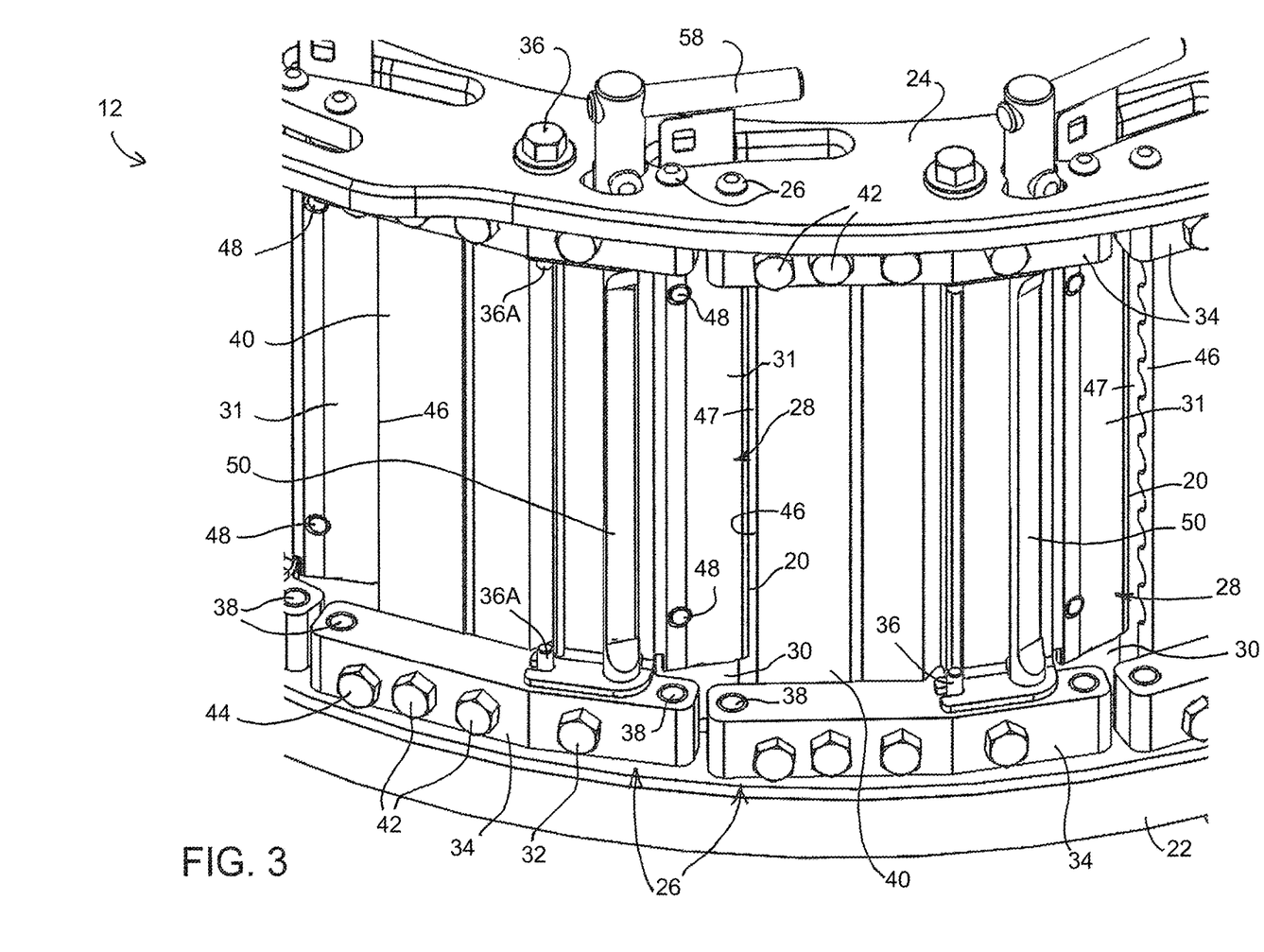
FIG. 3 is a detailed view showing a fragment of the cutting head of FIG. 3.
Figure 4:
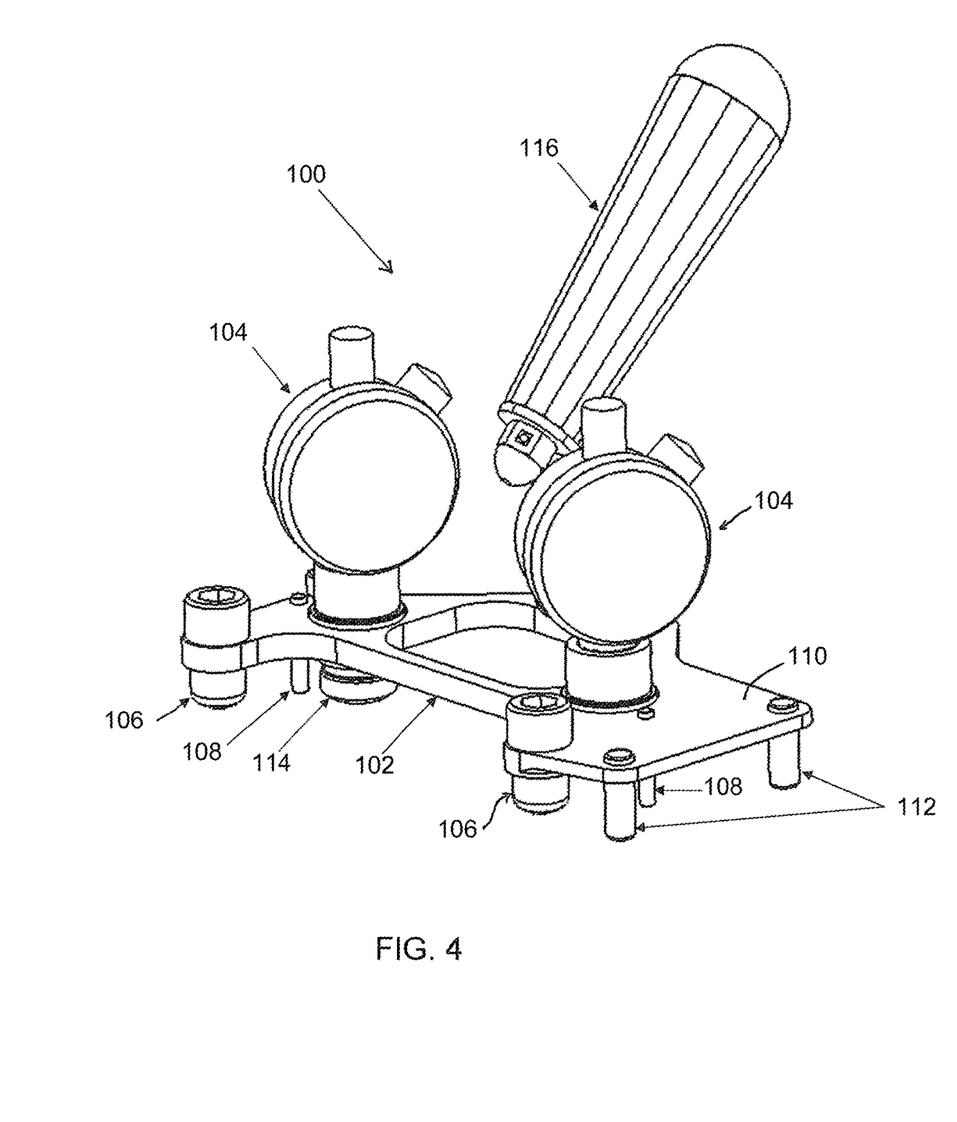
FIG. 4 schematically represents a perspective view representing a gauge system suitable for use with the cutting head of FIGS. 2 and 3.
Figure 5:
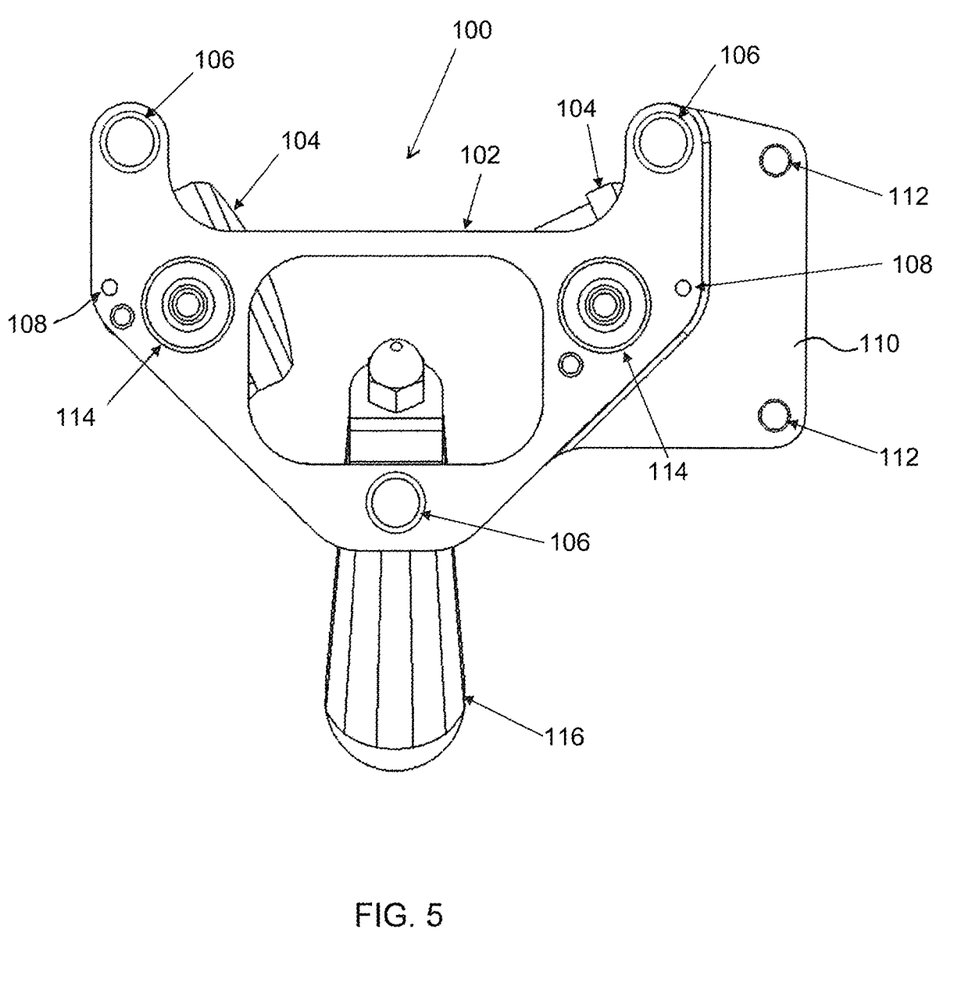
FIG. 5 is a bottom view of the gauge system of FIG. 4.
Figure 6A:
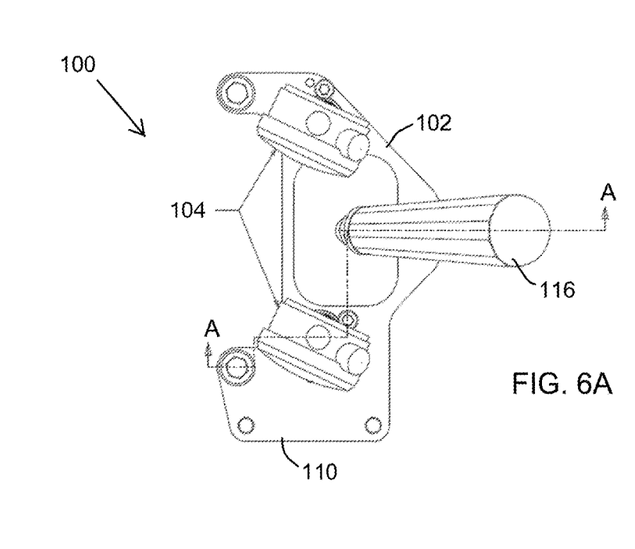
FIGS. 6A, 6B, and 6C schematically represent, respectively, top, cross-sectional, and perspective views of the gauge system of FIGS. 4 and 5.
Figure 6B:
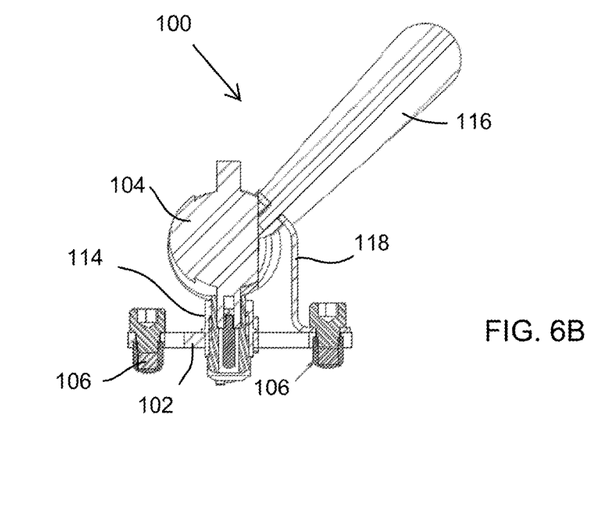
Figure 6C:
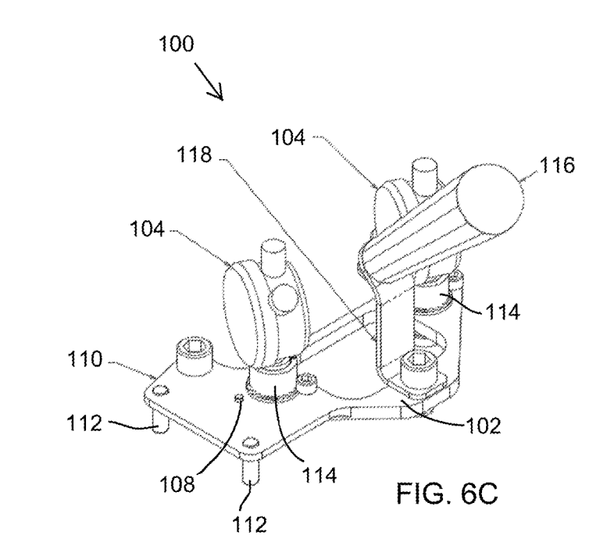

FIGS. 2 and 3 contain isolated views of a particular but nonlimiting embodiment of a cutting head 12 that is capable of use with a variety of cutting machines, including the Model CC® slicing machine 10 depicted in FIG. 1, and in some instances may be a modification or retrofit for such a machine. The cutting head 12 will be described hereinafter in reference to the slicing machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIG. 2.

In the isolated view of FIG. 2, the cutting head 12 can be seen to be generally annular-shaped with cutting knives 20 mounted at its perimeter. Each knife 20 projects radially inward in a direction generally opposite the direction of rotation of the impeller 14 within the cutting head 12, and defines a cutting edge at its radially innermost extremity. The cutting head 12 further comprises lower and upper support rings 22 and ring 24 to and between which circumferentially-spaced modular units 26 are mounted. The knives 20 of the cutting head 12 are individually secured with clamping assemblies 28 to the modular units 26. As more readily evident in FIG. 3, the clamping assembly 28 of each modular unit 26 includes a knife holder 30 mounted with fasteners 32 to and between a pair of mounting blocks 34, which in turn are configured to be secured to the support rings 22 and 24 with fasteners 36 that rigidly secure the mounting blocks 34 to the rings 22 and 24. Each clamping assembly 28 further includes a clamp 31 mounted between the mounting blocks 34 so that the clamp 31 is positioned on the radially outward-facing side of the holder 30 to secure the knife 20 thereto. In the nonlimiting embodiment represented in FIGS. 2 and 3, the clamp 31 is pivotably mounted to the mounting blocks 34. While various means could be used as pivots for the clamp 31, in the embodiment shown the fasteners 36 that secure the mounting blocks 34 to the rings 22 and 24 extend through the blocks 34 to also define pivot pins 36A for the clamp 31.

As shown in FIG. 3, the knife 20 is supported by a radially outer surface of the knife holder 30, and the clamp 31 overlies the holder 30 so that the knife 20 is between the surface of the holder 30 and a radially inward surface of the clamp 31 that faces the holder 30. Alignment of the knife 20, holder 30, and clamp 31 is achieved with pins 48 that protrude from the knife holder 30 into complementary slots and/or holes in the knife 20 and clamp 31. By forcing the clamp 31 toward the holder 30, the clamp 31 will apply a clamping force to the knife 20 adjacent its cutting edge.

In the nonlimiting embodiment represented in FIGS. 2 and 3, an eccentric cam rod 50 is used as a quick-clamping feature to apply the clamping force to the clamp 31. The cam rod 50 passes through holes in the clamp 31 and engage holes in the mounting blocks 34 to loosely assemble the clamp 31 to the mounting blocks 34 in combination with the pivot axis of the clamp 31 created by the pivot pins 36A. Clockwise rotation of the rod 50 (as viewed in FIG. 3) causes the rod 50 to eccentrically move into engagement with the surface of the clamp 31, forcing the clamp 31 into engagement with the knife 20. The force applied to the clamp 31 by the rod 50 can be released by rotating the rod 50 counterclockwise.

The mounting blocks 34 are equipped with pins 38 that engage holes in the support rings 22 and 24. By appropriately locating the holes in the rings 22 and 24, the orientation of the mounting blocks 34, and consequently the knife 20, knife holder 30, and clamp 31 mounted thereto, can be used to alter the radial location of the cutting edge of the knife 20 with respect to the axis of the cutting head 12, thereby providing relatively coarse control of the thickness of the sliced food product.

FIGS. 2 and 3 further show each modular unit 26 as comprising an adjustable gate 40 secured to the mounting blocks 34 with fasteners 42. A food product crosses the gate 40 prior to encountering the knife 20 mounted to the succeeding modular unit 26, and together the cutting edge of a knife 20 and a preceding trailing edge 46 of the preceding gate 40 define a gate opening 47 that determines the thickness of a slice produced by the knife 20. To provide relatively fine control of the thickness of a sliced product, the mounting blocks 34 are equipped with adjustment screws 44 that engage the gates 40 to alter the radial location of their trailing edges 46 relative to the cutting edge of the succeeding knife 20 and, in doing so, adjust the gate openings 47 that determine the thicknesses of slices produced by the cutting head 12.

Gauges are typically required to accurately adjust the positions of the gates 40 in order to adjust the gate openings 47. Such gauges may be in the form of or employ a dial indicator that is moved from station to station around the cutting head 12 to measure the position of each knife 20. If an operator is required to hold the gauge in position while adjusting the head 12, erroneous readings may result if the position of the gauge shifts during adjustment. Such measurement errors can be particularly problematic if very fine adjustments are necessary, for example, the very fine ("micro") adjustability possible with the cutting head 12 shown in FIGS. 2 and 3, as a nonlimiting example, over a range of about 0.020 inch (about 0.5 millimeters).

BRIEF DESCRIPTION OF THE INVENTION

The present invention provides instruments and methods for measuring and adjusting gate openings of a slicing machine.

According to one aspect of the invention, a gauge system is configured and adapted for measuring a gate opening of a cutting head of a slicing machine. The gauge system includes a frame, means for securing the frame to the interior surface of the cutting head, means for locating the frame relative to a knife and/or a gate of the cutting head that define the gate opening therebetween, and at least one means mounted to the frame for measuring the gate opening. The measuring means comprises an anvil biased in an outward direction relative to the frame, indicator means mounted to the anvil and biased therewith in the outward direction relative to the frame, and a probe of the indicator means biased in the outward direction relative to the indicator means. The probe and the anvil are configured and adapted to provide an outward measurement of the gate opening based on a differential measurement of surfaces of the knife and the gate of the cutting head.

According to another aspect of the invention, a method is provided for using a gauge system comprising elements as described above. The method includes securing the frame to the interior surface of the cutting head and locating the frame relative to the knife and/or the gate of the cutting head so that the anvil is biased in the outward direction into engagement with a surface of the knife and the probe is biased in the outward direction into engagement with a surface of the gate, and then performing a measurement of the gate opening based on the differential measurement of the surfaces of the knife and the gate.

Other aspects and advantages of this invention will be appreciated from the following detailed description.

DETAILED DESCRIPTION OF THE INVENTION

FIGS. 4 through 6C represent various views of a gauge system 100 suitable for measuring and adjusting gate openings of a slicing machine, for example, a centrifugal-type slicing machine of the type represented in FIG. 1 equipped with the cutting head 12 represented in FIGS. 2 and 3. On the basis of the coaxial arrangement of the cutting head 12 and the impeller 14 of the machine 10, relative terms including but not limited to "axial," "circumferential," "radial," etc., and related forms thereof may also be used below to describe the nonlimiting embodiment represented in the drawings. Furthermore, as used herein, "trailing" (and related forms thereof) refers to a position on the cutting head 12 that follows or succeeds another in the direction of rotation of the impeller 14 within the cutting head 12, whereas "leading" (and related forms thereof) refers to a position on the cutting head 12 that is ahead of or precedes another in the direction opposite the rotation of the impeller 14. All such relative terms are intended to indicate the construction and relative orientations of components and features of the cutting head 12, and therefore are relative terms that are useful in the discussion of the gauge system 100, but should not be otherwise interpreted as limiting the scope of the invention.

The gauge system 100 is represented as comprising a frame 102, a pair of dial indicators 104 mounted to the frame 102, a set of magnetic units 106 mounted to and extending from the frame 102, and locator pins 108 that are mounted to the frame 102 and extend in the same direction of the frame 102 as the magnetic units 106. The dial indicators 104 are configured to perform linear measurements in an outward direction, preferably in a radially-outward direction, of the cutting head 12, and as such it is foreseeable that other indicator means (mechanical or electronic, proximity sensors, etc.) could be used in place of the dial indicators 104 represented in the drawings. Each dial indicator 104 is mounted with a plunger assembly 114 that extends in the same direction of the frame 102 as the magnetic units 106 and locator pins 108.

The magnetic units 106 are for the purpose of magnetically securing the gauge system 100 to the cutting head 12. The drawings represent the system 100 as comprising three units 106 to provide a stable platform for the system 100, though it is foreseeable that the fewer or more units 106 could be employed as long as a stable platform is established. In addition, it is foreseeable that means other than magnets could be employed to secure the system 100 to the cutting head 12, as nonlimiting examples, a vacuum suction device or a mechanical device that pulls and holds the frame 102 against the cutting head 12.

The frame 102 is represented as comprising a hanger 110 equipped with at least two hanger pins 112. Though shown as an integral portion of the frame 102, it is foreseeable that the hanger 110 could be separately formed and attached to the frame 102. In combination, the locator and hanger pins 108 and 112 serve as means for positively locating the gauge system 100 on the cutting head 12 to enable the dial indicators 104 to be used to make consistently accurate measurements in relation to the cutting head 12 and, as discussed below, the gate openings 47 of the cutting head 12.

A handle 116 is coupled to the frame 102, for example, with a bracket 118. The handle 116 facilitates handling and manipulation of the system 100 during its use.

Figure 7:
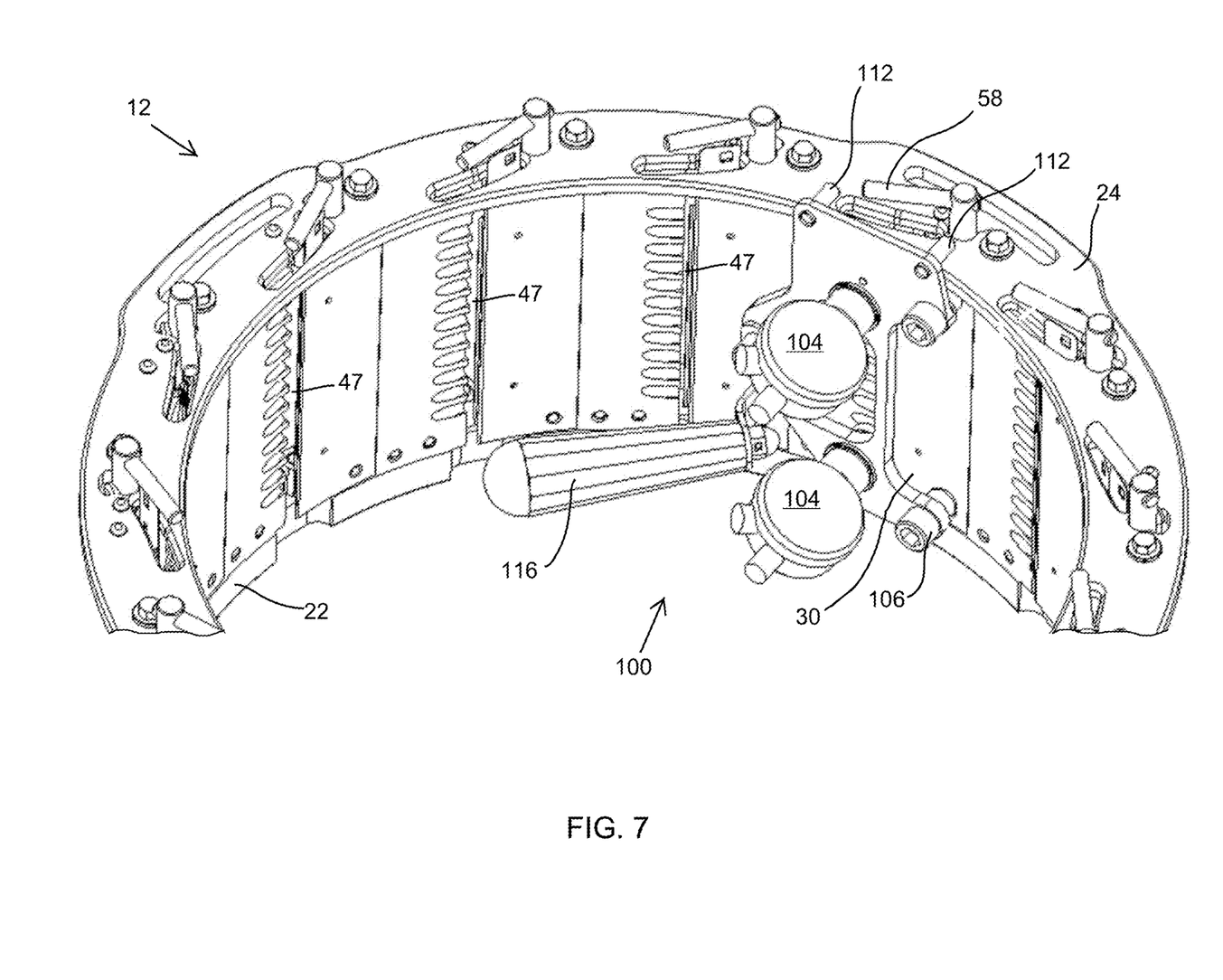
FIG. 7 is a perspective view representing the gauge system of FIGS. 4 through 6C in use to measure and adjust a gate opening of the cutting head of FIGS. 2 and 3.
Figure 8:
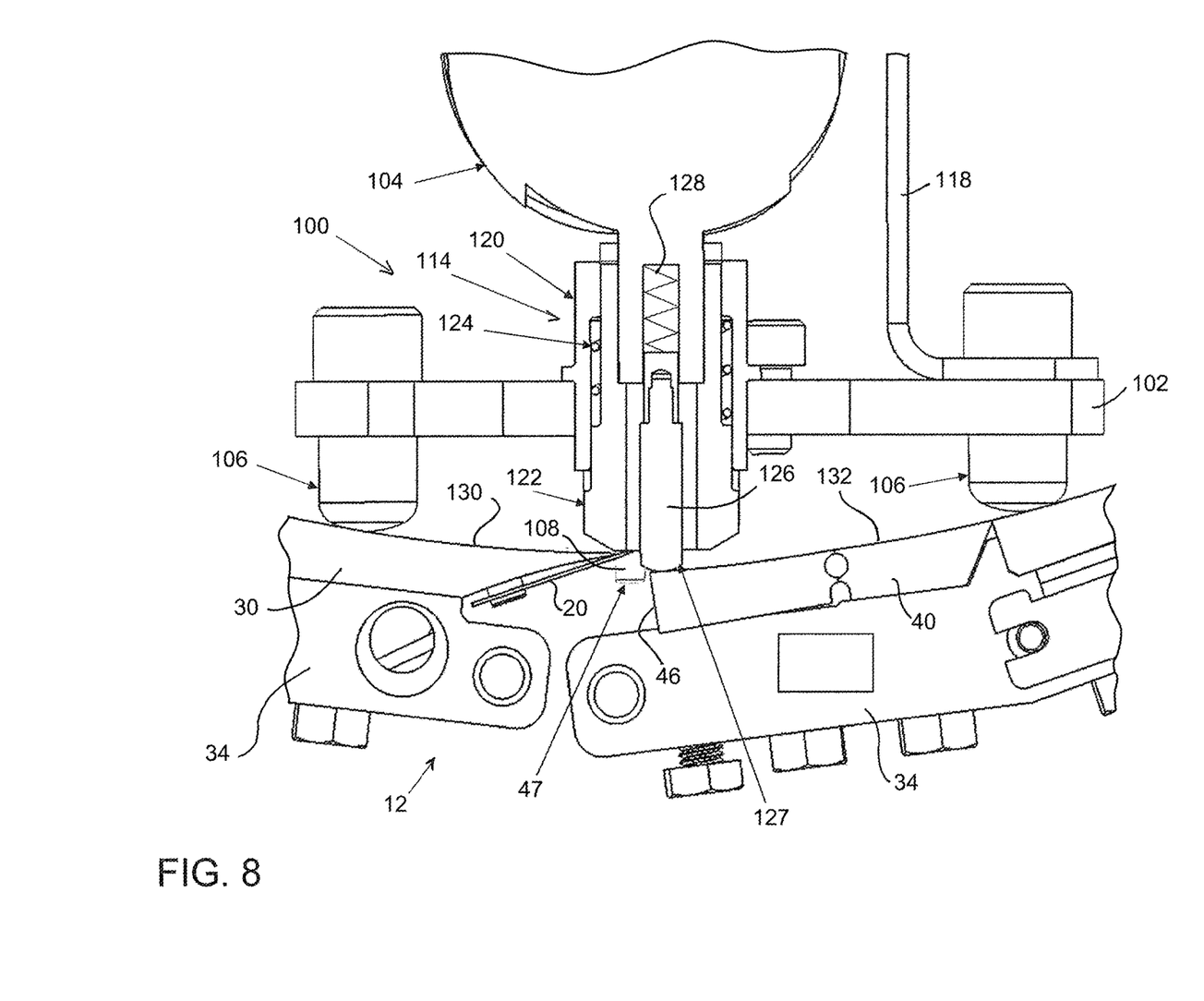
FIG. 8 is a detailed side axial end view of the cutting head of FIG. 7 showing the gauge system of FIGS. 4 through 6C in use to measure and adjust a gate opening of the cutting head.

A nonlimiting example of a method of using the gauge system 100 of FIGS. 4 through 6C is represented in FIGS. 7 and 8. FIG. 8 shows one of the dial indicators 104 and its plunger assembly 114 in cross-section. The detailed view offered by FIG. 8 depicts the manner in which the system 100 and its components interact with the cutting head 12 and its components.

The plunger assembly 114 is shown in FIG. 8 as comprising a housing 120 secured to the frame 102, an anvil 122 reciprocably received in a bore defined within the housing 120, and a spring 124 that biases the anvil 122 away from the housing 120 and in the radially-outward direction of the cutting head 12. The dial indicator 104 is secured to the anvil 122 opposite its protruding end. The dial indicator 104 is shown as conventionally equipped with a probe 126 having a mechanical contact tip 127 and biased by a second spring 128 to protrude from a bore defined in the anvil 122. Though an entirely mechanical indicator 104 is represented, it is foreseeable that an electronic probe could be employed that does not require mechanical contact with a surface being measured with an indicator. Both the probe 126 and anvil 122 are biased in the same direction of the frame 102 as the magnetic units 106 and locator pins 108 (one of which is visible in FIG. 8). Components of the cutting head 12 shown in FIG. 8 as interacting with the system 100 include the knife 20, knife holder 30, and gate 40, as identified in FIGS. 2 and 3. Other components of the cutting head 12 seen in FIG. 8 are identified with reference numbers consistent with FIGS. 2 and 3.

The combination of the biased probe 126 and anvil 122 provides in effect a dual-acting plunger assembly 114, wherein an external portion of the assembly 114 (defined by the anvil 122) is adapted to register its corresponding dial indicator 104 at zero on the radially-inward facing surface of the knife 20 adjacent its cutting edge, and an internal portion of the assembly 114 (defined by the probe 126) is adapted to register on a surface 132 of the gate 40 adjacent the gate opening 47, which is defined as the axial distance between the cutting edge of the knife 20 and the adjacent edge 46 of the gate 40. As such, the probe 126 is able to accurately measure the gate opening 47 and, consequently, acquire a true slice thickness reading for slices made with the knife 20.

The process of mounting the gauge system 100 includes contacting the internal walls of the cutting head 12 (for example, the radially inward surfaces 130 and 132 of the knife holders 30 and gates 40) with the magnet units 106, which magnetically secure the system 100 to the cutting head 12. The magnet units 106 and locator pins 108 are mutually sized and positioned so that, in order for all three magnet units 106 to contact the cutting head 12, each locator pin 108 is received in a location between the gate edge 46 and knife holder 30 adjacent either one of the lower and upper support rings 22 and 24 and also adjacent one of the oppositely-disposed ends of the knife 20. The locator pins 10 are preferably pushed circumferentially against the knife holder 30, as shown in FIG. 8. The hanger pins 112 rest on the upper support ring 24 of the cutting head 12 to support the weight and constrain the gauge system 100 along the axis of the cutting head 12. Accordingly, in combination the locator and hanger pins 108 and 112 positively locate the gauge system 100 on the cutting head 12 as a result of the locator pins 108 circumferentially locating the gauge system 100 on the cutting head 12 (using the knife holder 30 as the circumferential locating feature on the cutting head 12) and the hanger pins 112 axially locating the gauge system 100 on the cutting head 12 (using the upper support ring 24 as the axial locating feature on the cutting head 12) to enable the dial indicators 104 to make consistently accurate measurements of the gate opening 47.

When mounted to the cutting head 12 as represented in FIGS. 7 and 8, the dial indicators 104 are positioned on a radially-inward side of the frame 102 relative to the cutting head 12, and their plunger assemblies 114 are positioned on a radially-outward side of the frame 102, i.e., between the frame 102 and cutting head 12. The magnet units 106 magnetically hold the gauge system 100 to the cutting head 12, defining an initial plane. The locator pins 108 positively position the gauge system 100 circumferentially against the knife holder 30, and the hanger pins 112 locate the gauge system 100 along the axis of the cutting head 12. The locator pins 108 also position the dial indicators 104 along the axial length of the gate opening 47, so that the indicators 104 simultaneously perform measurements at different locations of the gate opening 47. As noted above, each plunger assembly 114 provides two spring-loaded surfaces, wherein the anvil 122 is spring-loaded to provide light but consistent contact with the knife 20, and the dial indicator probe 126 is spring-loaded to provide light but consistent contact with the gate 40, such that the resulting linear measurement obtained with the dial indicator 104 will correspond to the relative distance between the knife 20 and gate 40 to determine the thickness of a slice produced with the knife 20. Once positioned as shown in FIGS. 7 and 8, the gauge system 100 is able to remain in position without being manually held, thus reducing if not preventing unintended motion of the system 100 and freeing the hands of an operator to make adjustments to the gate opening 47. As the gate opening 47 is adjusted, the dial indicator 104 adjusts to accurately measure the gate opening 47. Even if the position of the gauge system 100 were not in the exact position intended, the spring-loaded adjustable reference surface provided by the anvil 122 ensures an accurate reading is obtained throughout the adjustment process.

While the invention has been described in terms of a particular embodiment, it should be apparent that alternatives could be adopted by one skilled in the art. For example, the gauge system 100 and its components could differ in appearance and construction from the embodiment described herein and shown in the drawings, and functions of certain components could be performed by components of different construction but capable of a similar (though not necessarily equivalent) function. As a nonlimiting example, though shown as separately formed and attached to the frame 102, it is foreseeable that the magnet units 106, locator pins 108, and/or hanger pins 112 could be fabricated as integral portions of the frame 102. Furthermore, various materials could be used in the fabrication of the system 100 and/or its components. As such, it should be understood that the above detailed description is intended to describe the particular embodiment represented in the drawings and certain but not necessarily all features and aspects thereof, and to identify certain but not necessarily all alternatives to the represented embodiment and described features and aspects. As a nonlimiting example, the invention encompasses additional or alternative embodiments in which one or more features or aspects of the disclosed embodiment could be eliminated. Accordingly, it should be understood that the invention is not necessarily limited to any embodiment described herein or illustrated in the drawings, and the phraseology and terminology employed above are for the purpose of describing the illustrated embodiment and do not necessarily serve as limitations to the scope of the invention. Therefore, the scope of the invention is to be limited only by the following claims.

The invention claimed is:

1. A gauge system configured and adapted for measuring a gate opening of a slicing machine, the gauge system comprising:
    a frame;
    means for securing the frame to an interior surface of a cutting head of the slicing machine, the cutting head having an annular shape that has an axis and a circumferential direction;
    means for locating the frame relative to a knife and/or a gate of the cutting head that define the gate opening therebetween and relative to the annular shape of the cutting head to axially and circumferentially position the gauge system on the interior surface of the cutting head, the locating means comprising:
        locator pins extending in an outward direction from the frame and located on the frame to circumferentially position the gauge system on the cutting head; and
        hangers extending in the outward direction from the frame and located on the frame to axially position the gauge system on the cutting head; and
    at least one means mounted to the frame for measuring the gate opening in an outward direction of the cutting head, the measuring means comprising an anvil biased in the outward direction relative to the frame, indicator means mounted to the anvil and biased therewith in the outward direction relative to the frame, and a probe of the indicator means biased in the outward direction relative to the indicator means, the probe and the anvil being configured and adapted to provide a measurement of the gate opening based on a differential measurement of surfaces of the knife and the gate of the cutting head.

2. The gauge system according to claim 1, wherein the securing means comprises magnets.

3. The gauge system according to claim 1, wherein the gauge system comprises at least two measuring means for measuring different locations along an axial length of the gate opening.

4. The gauge system according to claim 1, wherein the slicing machine is a centrifugal-type slicing machine.

5. A method of using the gauge system according to claim 1, the method comprising:
    securing the frame to the interior surface of the cutting head and locating the frame relative to the knife and/or the gate of the cutting head so that the anvil is biased in the outward direction of the frame into engagement with a radially inward surface of the knife and the probe is biased in the outward direction of the frame into engagement with a radially inward surface of the gate; and
    performing the measurement of the gate opening with the indicator means based on the differential measurement of the radially inward surfaces of the knife and the gate.

6. The method according to claim 5, wherein the frame is magnetically secured to the interior surface of the cutting head with the securing means.

7. The method according to claim 5, wherein the locator pins extend in the outward direction from the frame to engage a circumferential locating feature of the cutting head and the hangers extend in the outward direction from the frame to engage an axial locating feature of the cutting head to axially and circumferentially position the gauge system on the cutting head.

8. The method according to claim 5, wherein the measurement of the gate opening with the indicator means simultaneously measures different locations along an axial length of the gate opening.

9. A gauge system configured and adapted for performing linear measurements of a gate opening of an annular-shaped cutting head of a slicing machine, the gauge system comprising:
    a frame;
    means for securing the frame to an interior surface of the cutting head;
    means for locating the frame relative to a knife and/or a gate of the cutting head that define the gate opening therebetween, the locating means comprising:
        locator pins extending in an outward direction from the frame and located on the frame to circumferentially position the gauge system on the cutting head; and
        hangers extending in the outward direction from the frame and located on the frame to axially position the gauge system on the cutting head; and
    at least one means mounted to the frame for performing the linear measurements in a radially-outward direction of the cutting head, the measurement means comprising an anvil biased in the radially-outward direction relative to the frame, indicator means mounted to the anvil and biased therewith in the radially-outward direction relative to the frame, and a probe of the indicator means biased in the radially-outward direction relative to the indicator means, the probe and the anvil being configured and adapted to provide a radially-outward measurement of the gate opening based on a differential measurement of surfaces of the knife and the gate of the cutting head.

* * * * *